3,322,835
t-BUTYL 2,2,2-TRIPHENYLETHYL ETHER
William H. Starnes, Jr., Baytown, Tex., assignor, by mesne assignments, to Esso Research and Engineering Company, Elizabeth, N.J., a corporation of Delaware
No Drawing. Filed Dec. 16, 1963, Ser. No. 330,629
1 Claim. (Cl. 260—611)

The present invention is directed to a new composition of matter, a method of making it, and a method of using it. More particularly, the present invention is directed to a novel heat-transfer agent, t-butyl 2,2,2-triphenylethyl ether.

In the transfer of heat in systems maintained at high temperatures, the liquid heat-transfer medium is often subjected to critically high temperatures for extended periods of time. This leads to oxidative decomposition of many materials otherwise suitable as heat-transfer fluids, forming degradation products of high vapor pressure. This is unsuitable since the medium should be retained as a liquid having a low vapor pressure at high temperatures. The fluid should also exhibit low corrosivity and toxicity.

The heat-transfer agent of the present invention meets all of these criteria. It has a low vapor pressure at high temperatures, and is sufficiently fluid at these high temperatures to be pumped within a closed heat-transfer system.

The heat-transfer system wherein the present invention is preferably used can be roughly described as comprising a first heat exchanger, a second heat exchanger, and means for pumping the liquid in a closed system between the two heat exchangers. The first heat exchanger may abstract heat from a heat source such as a gas-fired furnace into the circulating fluid, while the second heat exchanger will transfer this heat from the fluid into the stream to be heated. Where the temperature at the second heat exchanger is no lower than 110° C. (so that the material will not solidify), t-butyl 2,2,2-triphenylethyl ether is an admirable heat-transfer agent. At temperatures above 200° C. it is particularly useful in view of its low vapor pressure. In view of the fact that the viscosity of the material decreases as it is heated, the t-butyl 2,2,2-triphenylethyl ether is more easily pumped and is therefore more suitably employed at temperatures above 150° C., preferably 200–250° C.

Unlike aliphatic ethers which oxidize at the alpha carbon atom, the t-butyl 2,2,2-triphenylethyl ether of the present invention is remarkably stable and resistant to oxidation. This is due to the fact that the methylene group alpha to the oxygen linkage is sterically hindered by the phenyl substituents on the beta carbon atom, as well as by the t-butyl group attached to the oxygen linkage. Thus, the present invention provides a heat-transfer agent of great utility.

The novel composition is exemplified by the following formula:

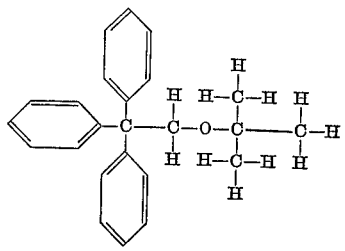

It is obtained by the reaction of 2,2,2-triphenylethanol with isobutylene under catalysis by sulfuric acid, and is recovered from the reaction mass by neutralization with a caustic material (such as sodium carbonate, sodium hydroxide, calcium hydroxide, etc.) followed by evaporation of the solvent. The material is crystallized from methanol in successive recrystallization in order to obtain a purified product.

As an example of the preparation of the compound of the present invention, the following run was made.

Example 1

A solution of 2,2,2-triphenylethanol (2.00 g., 0.00729 mol) in 50 ml. of methylene chloride was stirred at room temperature for one hour and saturated by bubbling with a stream is isobutylene. Concentrated sulfuric acid (0.50 ml.) was then added, and stirring was continued for an additional two hours, during which time sufficient isobutylene was added to maintain saturation. The solution was stoppered, allowed to stand overnight, and then neutralized and extracted with two 25-ml. portions of 1 N aqueous sodium carbonate to neutralize and remove the acid catalyst. Aqueous extracts and a methylene chloride raffinate layer are obtained. The combined aqueous extracts were extracted repeatedly with small portions of ether (25 ml.) and methylene chloride (25 ml.) until the aqueous portion was no longer cloudy, and all the organic layers were added to the original methylene chloride layer. The organic moiety was then washed with 75 ml. of water in two portions, dried over Drierite, and evaporated to give an essentially quantitative yield of t-butyl 2,2,2-triphenylethyl ether, melting point 101–104.5° C. Repeated recrystallization from methanol gave the pure product, melting point 106–107° C. Its structure was proven by elemental analysis and by infrared, nuclear magnetic resonance, and mass spectra.

Having disclosed the novel composition, its use, and a method of preparing it, what is desired to be protected by Letters Patent should be limited not by the specific example herein given, but rather by the appended claim.

I claim:

A composition of matter having the formula:

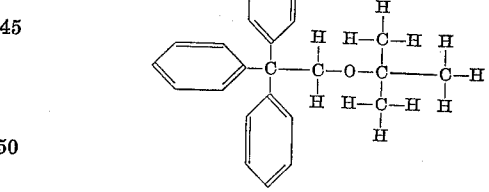

characterized by being crystalline and having a melting point of 106–107° C.

References Cited
UNITED STATES PATENTS 1,968,601 7/1934 Edlund et al. _____ 260—614
2,411,428 11/1946 Hechenbleikner __ 260—611 X
2,726,211 12/1955 Schafer _____ 252—70

FOREIGN PATENTS 393,753 6/1933 Great Britain.

OTHER REFERENCES

Beilstein, Organische Chemie, vol. VI (1944), page 697.
Wagner et al., Synthetic Organic Chemistry (1953), pages 232–233.

BERNARD HELFIN, Acting Primary Examiner.